Figure 1:
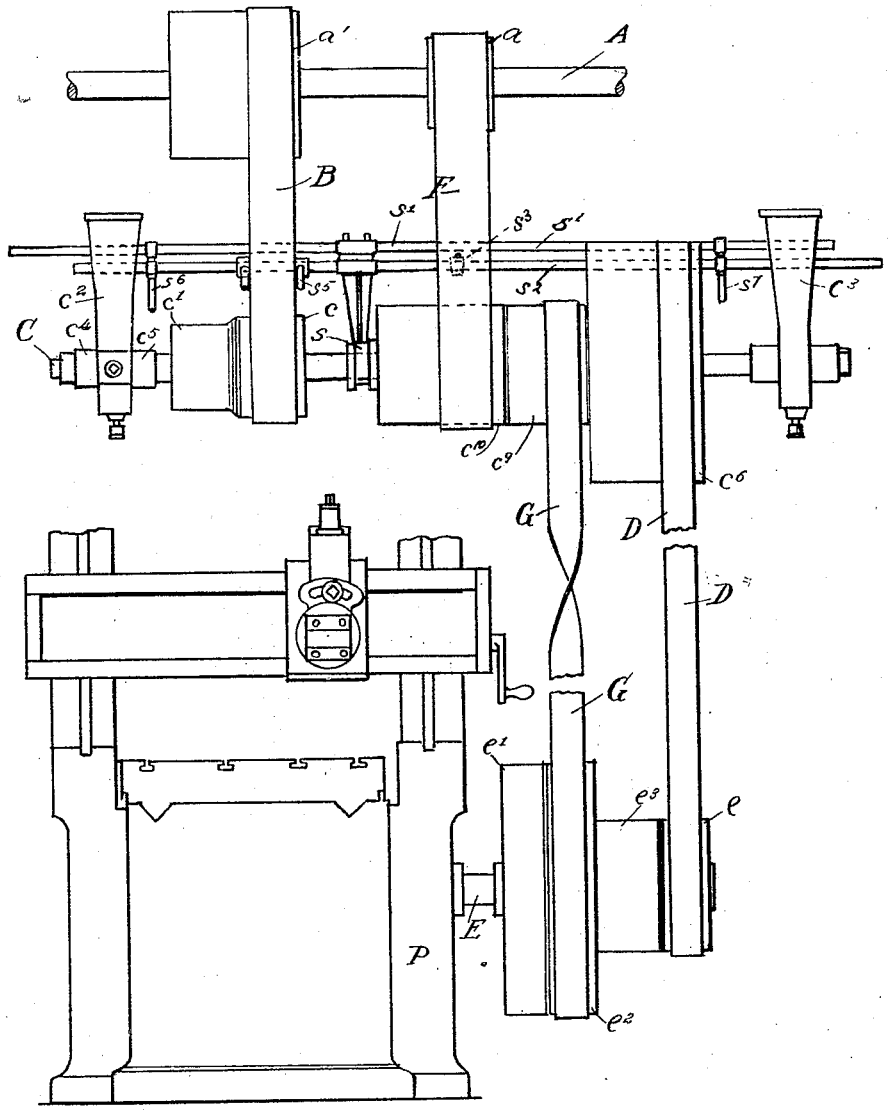

June 30, 1925.

H. W. HUNT

POWER TRANSMITTING DEVICE

Filed July 7, 1923

1,544,455

2 Sheets-Sheet 1

INVENTOR:
Howard W. Hunt
BY Walter A. Knight
ATTORNEY.

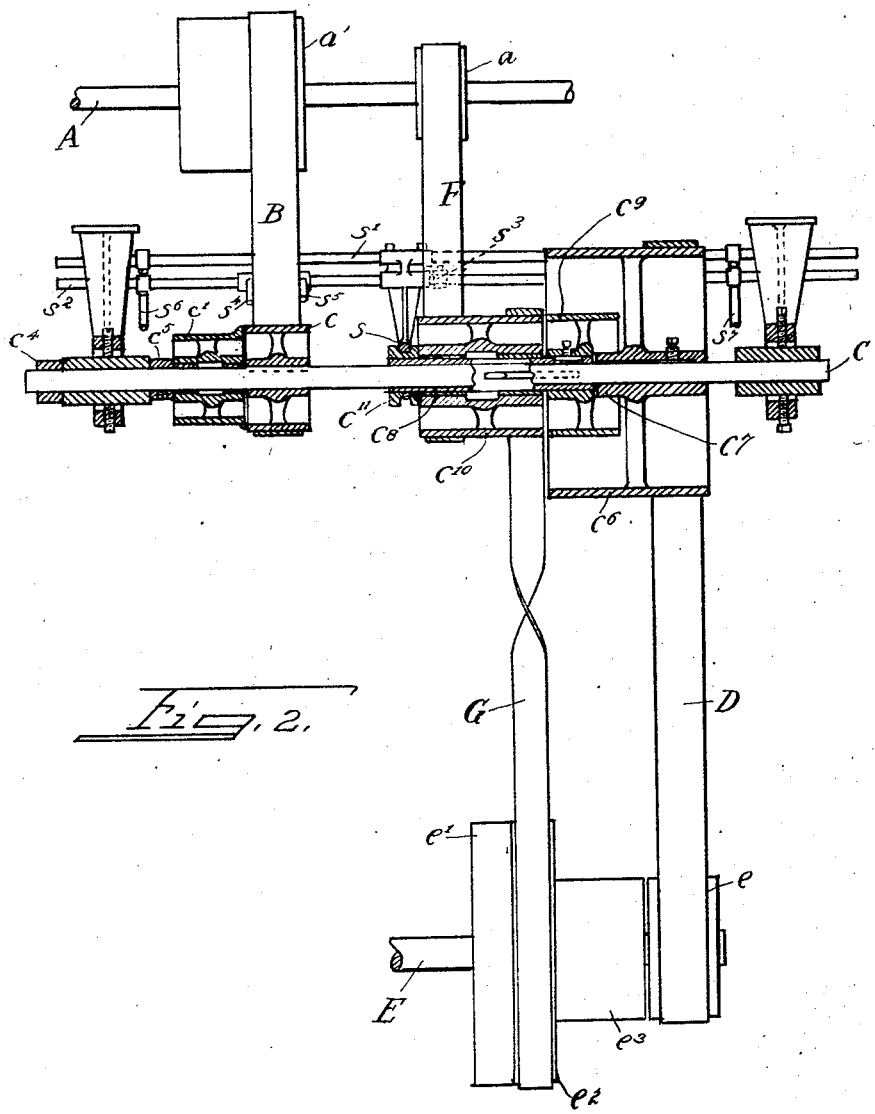

Patented June 30, 1925.

1,544,455

UNITED STATES PATENT OFFICE.

HOWARD W. HUNT, OF CINCINNATI, OHIO.

POWER-TRANSMITTING DEVICE.

Application filed July 7, 1923. Serial No. 650,035.

*To all whom it may concern:*

Be it known that HOWARD W. HUNT, a citizen of the United States, residing at Cincinnati, in the county of Hamilton and State of Ohio, has invented new and useful Improvements in Power-Transmitting Devices, of which the following is a specification.

My invention relates to improvements in power transmitting devices employing belts and is adapted for use on reciprocating mechanisms, particularly for machine tools, such as planers and shapers.

The object of my invention is to provide means for driving a pulley at either of two speeds, without shifting the belt which drives it.

It will be understood that this device may be employed whenever it is desired to drive a pulley at either of two speeds by means of a single belt.

In the particular embodiment of my invention selected for illustration:

Fig. 1 is a front end elevation of a metal planer, its counter shaft and the power shaft equipped with my improved device, the planer shaft being driven at high speed, and Fig. 2 is a vertical axial section through the countershaft, its pulleys, etc. with the driving shaft and its pulleys shown in full, the planer shaft being driven at low speed.

Referring now to the drawings, A is a line shaft, to which is rotatably secured pulley $a$, and the wide faced pulley $a^1$ upon which the belt B may be shifted.

C is a counter shaft, to which is rotatably secured pulley $c$ and upon which is loose pulley $c^1$, upon either of which the belt B may be shifted. The counter shaft is supported by hangers $c^2$, $c^3$ and held against endwise movement by collars $c^4$, $c^5$.

Rotatably secured to the shaft C is a wide faced pulley, $c^6$ with inset hub on its inner side $c^7$, and upon this pulley is the open belt D for the return drive.

A metal planer P has a drive shaft E, with loose pulley $e$ for the return drive belt D, and $e^1$ for the cross belt G for the cutting drive. Pulley $e^2$ for the belt G and $e^3$ for the belt D are preferably cast integral and are rotatably secured to the shaft E. Obviously these fixed pulleys $e^2$ and $e^3$ might be two separate pulleys each keyed or otherwise fixed to the shaft.

The belt D may be shifted upon either pulley $e$ or $e^3$ and the belt G may be shifted upon either pulleys $e^1$ or $e^2$ by shifter mechanism commonly employed in planers. When the belt G is in the position shown in the drawings, the planer shaft E is being rotated for the cutting stroke.

Splined to the shaft C is the sleeve $c^8$, and rotatably secured to said sleeve is pulley $c^9$. Loose on the sleeve $c^8$ is the pulley $c^{10}$, driven by belt F from the pulley $a$. A grooved ring $c^{11}$ secured to the sleeve $c^8$ engages a forked shifter $s$, fixed to the shifter rod $s^1$, and affords means for sliding said sleeve longitudinally of the shaft so as to bring the pulley $c^9$ under the belt G, or clear of it by pushing it under the inner edge of the pulley $c^6$. A second shifter rod $s^2$ passes thru a hole in the shifter $s$, and to said rod is secured a collar $s^3$, and shifter arms $s^4$, $s^5$, said collar $s^3$ operates to move shifter $s$ simultaneously with shifter arms $s^4$, and $s^5$ when the rod $s^2$ is moved to the left when stopping the machine. The rods $s^1$ and $s^2$ are guided through holes in the supports $s^6$, $s^7$.

It will be seen that the belt B is being used in the position shown in the drawings, to drive the shaft C through the pulley $c$, and that whenever this shaft is not to be so driven, the belt B is shifted to the loose pulley $c^1$.

As shown in the drawings, the shaft C drives pulley $c^6$ which in turn by means of the belt D drives the loose pulley $e$; but when the belt D is shifted onto the pulley $e^3$, then the pulley $c^6$ drives the planer shaft E for the return stroke thru the belt D and pulley $e^3$.

It will also be seen that the belt F is being used in the position shown in the drawings, to drive the loose pulley $c^{10}$, which in turn drives at low speed the planer shaft E on the cutting stroke thru the cross belt G. When shifted to the left the belt G drives the loose pulley $e^1$ at the same speed.

When the sleeve $c^8$ is drawn to the left, the shaft C thru the pulley $c^9$, belt G and pulley $e^2$ may drive the planer shaft E at high speed, or the loose pulley $e^1$ at the same speed.

The mechanism shown and described ensures either of two speeds on the cutting stroke, but one speed on the return stroke.

The shifters for the belts G and D are adapted to be operated simultaneously, in any usual manner.

It will be apparent to anyone skilled in the art, that the relative diameters of these various pulleys may be changed at will to secure the speeds desired under any of the various driving conditions. I do not intend to limit myself to the precise mechanism shown, but conceive as within the scope of my invention, any mechanism readable upon the claims which may be allowed hereon.

I claim as my invention and desire to secure by Letters Patent of the United States:

1. A shaft, a first pulley slidable upon and rotatable by the said shaft, a second pulley co-axial with and both slidable and rotatable with relation to the said shaft, means for simultaneously shifting the said pulleys axially, and a belt drivable by either of said pulleys.

2. A shaft, a first pulley co-axial with said shaft, slidable with relation thereto and rotatable by the said shaft, a second pulley co-axial with and both slidable and rotatable with relation to the said shaft, means for simultaneously shifting the said pulleys axially, a belt drivable by either of said pulleys, and means for driving said second pulley.

3. A shaft, a first pulley co-axial with said shaft, slidable with relation thereto and rotatable by the said shaft, a second pulley, co-axial with and both slidable and rotatable with relation to said shaft, means for driving the said shaft at a predetermined speed, means for driving the said second pulley at a speed different from that of the shaft, means for simultaneously shifting the said pulleys axially, and a belt drivable by either of said pulleys.

4. In mechanism for transmitting power from a line shaft to a driven shaft; a counter shaft, a sleeve splined to said counter shaft, a pulley rotatably secured to said sleeve, a loose pulley on said sleeve of substantially the same diameter as the fixed pulley, a belt for transmitting power from said line shaft to the loose pulley on said sleeve, a belt for transmitting power from either of said pulleys on the sleeve to the driven shaft and means for so sliding said sleeve on the counter shaft as to bring the last named belt upon either the loose pulley or the fixed pulley at will.

5. In combination with a line shaft having two driving pulleys thereon, and a driven shaft having a tight and loose pulley for reverse driving, and a tight and loose pulley for forward driving; a counter shaft, pulley means thereon for driving and not driving said counter shaft at will from one of the pulleys on the line shaft, a fixed pulley on said counter shaft for driving the tight and loose return pulleys, a sleeve on said countershaft and splined thereto, means for longitudinally shifting the position of said sleeve on said shaft, a loose pulley on said sleeve adapted to be driven from the other pulley on said line shaft, a fixed pulley on said sleeve, a belt adapted to drive either the tight or loose pulley for forward driving on the driven shaft, and means for shifting said sleeve longitudinally of said counter shaft to bring either the loose or the fixed pulley into driving contact with said belt.

In testimony whereof I have hereunto set my hand.

HOWARD W. HUNT.